(12) United States Patent
Jiang

(10) Patent No.: US 9,354,785 B1
(45) Date of Patent: May 31, 2016

(54) TEXT ENTERING WITH REMOTE CONTROL SYSTEM

(71) Applicant: Peigen Jiang, Sammamish, WA (US)

(72) Inventor: Peigen Jiang, Sammamish, WA (US)

( * ) Notice: Subject to any disclaimer, the term of this patent is extended or adjusted under 35 U.S.C. 154(b) by 0 days.

(21) Appl. No.: 14/797,691

(22) Filed: Jul. 13, 2015

(51) Int. Cl.
*G06F 3/048* (2013.01)
*G06F 3/0482* (2013.01)
*G06F 3/02* (2006.01)
*G06F 3/0484* (2013.01)

(52) U.S. Cl.
CPC ............ *G06F 3/0482* (2013.01); *G06F 3/0219* (2013.01); *G06F 3/04842* (2013.01)

(58) Field of Classification Search
CPC ........................ G06F 3/04842; G06F 3/0482
See application file for complete search history.

(56) References Cited

U.S. PATENT DOCUMENTS

| | | | | | |
|---|---|---|---|---|---|
| 6,016,142 | A * | 1/2000 | Chang | .................... | G06F 3/0236 345/168 |
| 8,576,170 | B2 * | 11/2013 | Cordes | .................... | G06F 3/016 345/161 |
| 9,134,809 | B1 * | 9/2015 | Mak | ....................... | G06F 3/0221 |
| 2002/0063687 | A1 * | 5/2002 | Kim | ....................... | G06F 3/0236 345/160 |
| 2002/0145587 | A1 * | 10/2002 | Watanabe | ............... | G06F 3/018 345/156 |
| 2006/0271886 | A1 * | 11/2006 | Wenstrand | ............ | G06F 3/0234 715/860 |
| 2006/0282791 | A1 * | 12/2006 | Bogomolov | .......... | G06F 3/0236 715/773 |
| 2007/0294636 | A1 * | 12/2007 | Sullivan | ................ | G06F 3/0236 715/810 |
| 2010/0141609 | A1 * | 6/2010 | Frisbee | .................. | G06F 3/0234 345/184 |
| 2010/0287505 | A1 * | 11/2010 | Williams | .............. | G06F 3/0234 715/823 |
| 2013/0002575 | A1 * | 1/2013 | Endo | ...................... | G06F 3/0236 345/173 |
| 2013/0191773 | A1 * | 7/2013 | Edwards | ................ | G06F 17/276 715/780 |
| 2014/0111434 | A1 * | 4/2014 | Yang | ....................... | G06F 3/005 345/160 |
| 2016/0034179 | A1 * | 2/2016 | Medina | ............... | G06F 3/04886 715/773 |

* cited by examiner

Primary Examiner — Dino Kujundzic

(57) ABSTRACT

A system for entering text into a computing device is disclosed, the system includes an on-screen displayed (OSD) keypad having a first predetermined number of lines of keys, and a remote control unit having the same predetermined number of shift buttons, each of the shift buttons corresponding to a unique one of the lines of keys, wherein a press of one of the shift buttons immediately causes a selection of a key in the line of keys corresponding to the pressed shift button regardless which key is previously selected.

13 Claims, 2 Drawing Sheets

TEXT ENTERING WITH REMOTE CONTROL SYSTEM

BACKGROUND

The present invention relates generally to character entering into a computing device, and, more particularly, to on-screen character entering with a remote control unit.

"Smart" consumer electronics that can interact with users, such as cable set-top boxes and media streaming devices, has become increasingly popular. These devices can take user's character input in the form of text. Even though conventional keyboard can be used for entering text, most such "smart" consumer electronics use simple remote control unit to control all aspects of the operation of the "smart" devices including entering text. As conventional hand-held remote control units have a very limited number of buttons, they generally utilize an on-screen displayed (OSD) keypad for entering text.

FIG. 1 illustrates a conventional OSD text entering system. A media streaming device 102 is connected to a TV set 110 through a cable 107. The media streaming device 102, for instance, can be an Apple TV. The cable 107 can exemplarily be a HDMI cable. The TV set display an OSD keypad 120 on its screen 113 when text entry operation is invoked. The OSD keypad has character keys: "a", "b", and "1", etc. The OSD keypad 120 also has command keys, such as "Cap", "Low", "#" and "←", representing "display capital letters", "display lower case letters", "display special characters" and "back space", respectively. As shown in FIG. 1, as the "Low" is highlighted, lower case letters are displayed in the OSD keypad 120. In this case, letter key "h" is highlighted, i.e., selected.

Referring again to FIG. 1, the conventional OSD text entering system also includes a remote control unit 130 having at least four shift buttons 132-138 and a enter button 141. The remote control unit 130 may use infrared signals or radio frequency signals to transmit the button pressing information to the media streaming device 102. The shift button 132-138 is for character selection on the OSD keypad to shift one character left, up, right and down, respectively, for every press of the buttons. In the case as shown in FIG. 1, when the enter button 141 is pressed, letter "h" is then entered. When shift button 132 is pressed, the selection will be shifted to letter key "g". If then the button 134 is pressed, the selection will be shifted to letter key "a". A problem with the conventional OSD text entering system is that often time two or more of the shift buttons 132-138 have to be pressed multiple times sequentially to reach a desired letter—and this can be slow and frustrating.

As such, what is desired is an OSD text entering system that can easily enter characters with a limited number of buttons.

Figure 1:
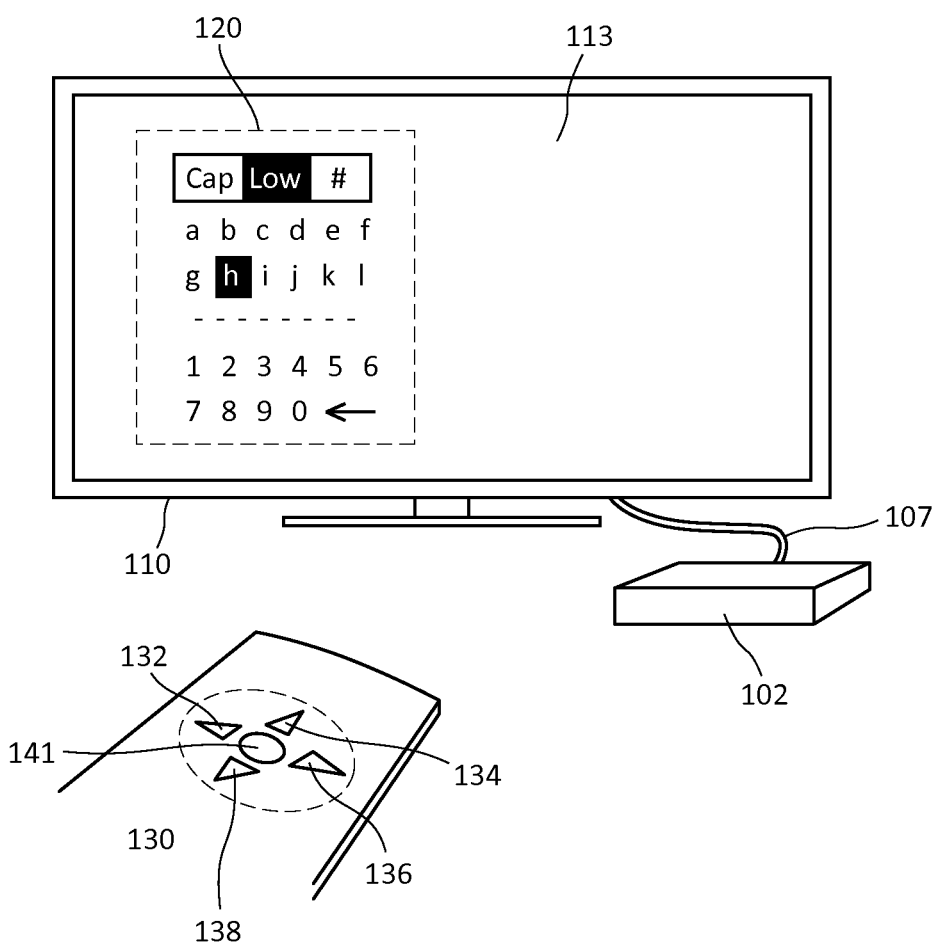
FIG. 1 illustrates a conventional OSD text entering system.

The drawings accompanying and forming part of this specification are included to depict certain aspects of the invention. A clearer conception of the invention, and of the components and operation of systems provided with the invention, will become more readily apparent by referring to the exemplary, and therefore non-limiting, embodiments illustrated in the drawings, wherein like reference numbers (if they occur in more than one view) designate the same elements. The invention may be better understood by reference to one or more of these drawings in combination with the description presented herein.

DESCRIPTION

The present invention relates to an on-screen displayed (OSD) text entering system. A preferred embodiment of the present invention will be described hereinafter with reference to the attached drawings.

Figure 2:
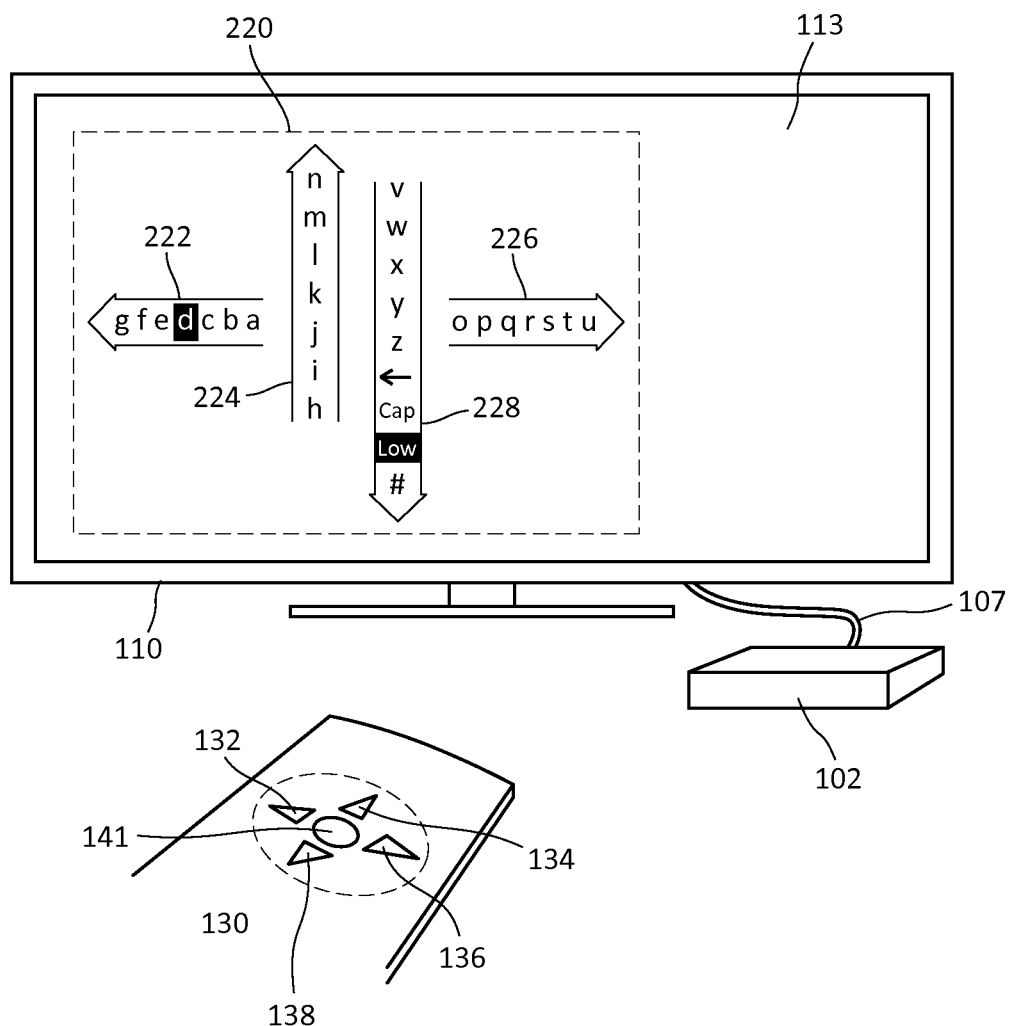
FIG. 2 illustrates an OSD text entering system according an embodiment of the present invention.

FIG. 2 illustrates an OSD text entering system according an embodiment of the present invention. The present OSD text entering system includes an exemplary media streaming device 102, connected to a TV set 113 through a cable 107. A remote control unit 130 has four shift buttons 132-138 (left, top, right and bottom, respectively) and a enter button 141 just as a conventional OSD text entering system shown in FIG. 1. The remote control unit 130 can transmit button pressing information to the media streaming device 102 via infrared or radio frequency signals.

However, as shown in FIG. 2, the present OSD text entering system displays a novel OSD keypad 220, in which four series of letter and command keys are lined up in four directions: leftward direction 222, upward direction 224, rightward direction 226 and downward direction 228. In an embodiment shown in FIG. 2, there are letter keys "a" through "g" in a line in the leftward direction 222; there are letter keys "h" through "n" in a line in the upward direction 224; there are letter keys "o" through "u" in a line in the rightward direction 226; and there are letter keys "v" through "z" and command keys "Cap", "Low" and "#" in a line in a downward direction 228. These lines of keys in directions 222, 224, 226 and 228 have no intersection, i.e., there is not a common key among these lines of keys. As shown in FIG. 2, the left shift button 132 incorporates an arrow symbol that coincides with the leftward direction 222. Similarly, the top shift button 134 incorporates an arrow symbol that coincides with the upward direction 224; the right shift button 136 incorporates an arrow symbol that coincides with the rightward direction 226; and the bottom shift button 138 incorporates an arrow symbol that coincides with the downward direction 228.

In operation, when letter key "d", which is the fourth key to the left in the leftward direction 222, is to be entered, a user can continuously press the left shift button 132 four times, then letter key "d" will be highlighted, and when the enter button 141 is pressed, letter key "d" will be entered into the media streaming device 102. With each press of the left shift button 132, the highlight will shift leftward by one key, so that the user can see exactly which key is selected without actually counting the number of button pressing. In addition, the highlight can only be shift in one direction, i.e., leftward for the leftward direction 222. After key "g" is selected, another press of the left shift button 132, key "a" will be selected, i.e., the selection shifts from the left to the right and back to the left.

After the enter button 141 is pressed, all the keys, but not the command keys ("Cap", "Low" and "#") will be deselected. If another letter key "g", which is the seventh key to the left in the leftward direction 222, is to be entered, a user has to continuously press the left shift button 132 seven times, and then press the enter button 141.

Referring again to FIG. 2, when letter key "j", which is third key to the top in the upward direction 224, is to be entered, a user can continuously press top shift button 134 three times, and then press the enter button 141. When letter key "o", which is the first key to the right in the rightward direction 226, is to be entered, a user needs to press the right shift button 136 only once, and then press the enter button 141.

Referring again to FIG. 2, in embodiments, no matter which letter key is currently highlighted, when a different shift button is pressed, keys in the direction that corresponds to the newly pressed shift button will be highlighted from a first key to the next depending on how many time the shift button is pressed. Such operation can best be illustrated by an example. Suppose a user intends to enter letter "x", but accidentally presses right shift button 136. As a result, letter key "o" is highlighted. The user can then switch to pressing the bottom shift button 138. After a first press of the bottom shift button 138, letter key "v" will be highlighted. Two more press of the bottom shift button 138 will shift the highlight to letter key "x".

Referring again to FIG. 2, as command "Low" is highlighted, the OSD keypad 220 displays and enters lower case letters. In order to shift to capital letters, one can press the bottom shift button 138 seven times to shift the highlight to command "Cap" which is in the seventh position to the bottom in the downward direction 228, and then press the enter button 141. The OSD keypad stays in capital letter display until either "Low" or "#" is selected. Pressing the bottom shift button 138 nine times, the command "#" will be selected, and then press the enter button 141, the OSD keypad 220 will display numeral and special character keys (not shown) in place of the letter keys in the four directions 222-228, and these characters can be entered in the same manner as described above.

In embodiments, the media streaming device 102 employs a central processing unit (not shown) to control the OSD keypad 220, process the button pressing signals from the remote control unit 130 and handle the aforementioned operations of the text entering. In other embodiments, the media streaming device 102 may be incorporated in the TV set 110.

While this disclosure has been particularly shown and described with references to exemplary embodiments thereof, it shall be understood by those skilled in the art that various changes in form and details may be made therein without departing from the spirit of the claimed embodiments.

What is claimed is:

1. A system for entering text into a computing device, the system comprising:
 an on-screen displayed (OSD) keypad having a first predetermined number of lines of keys, wherein each line of keys comprises a prearranged order of keys; and
 a remote control unit having the first predetermined number of shift buttons, each of the shift buttons corresponding to a unique one of the lines of keys and each of the shift buttons corresponding to a unique single direction,
 wherein a press of one of the shift buttons immediately causes a selection of a key in the line of keys corresponding to the pressed shift button regardless which key is previously selected and a subsequent press of the one of the shift buttons before another button on the remote control unit is pressed causes a selection of a next key in the line of keys corresponding to the pressed shift button in the corresponding direction.

2. The system of claim 1, wherein a continued pressing of the one of the shift buttons before another button on the remote control unit is pressed causes a further shift of key selection in the same line of keys in the corresponding direction.

3. The system of claim 2, wherein the further shift of key selection is one directional.

4. The system of claim 1, wherein the remote control unit further has an enter button, wherein when the enter button is pressed the selected key is entered into the computing device.

5. The system of claim 4, wherein the OSD keypad includes both character keys and command keys, and once the enter button is pressed, all the character keys are deselected.

6. The system of claim 1, wherein each of the shift buttons incorporates a directional symbol that coincides with the unique single direction of the corresponding line of keys.

7. The system of claim 1, wherein a first line of keys and a second line of keys are not in parallel to each other and have no intersection.

8. A system for entering text into a computing device, the system comprising:
 an on-screen displayed (OSD) keypad having a first line of keys and a second line of keys not in parallel to each other, wherein each line of keys comprises a prearranged order of keys and wherein each key in the first line is different from each key in the second line; and
 a remote control unit having an enter button, a first shift button corresponding to the first line of keys and a second shift button corresponding to the second line of keys, the first shift button corresponding to a first direction and the second shift button corresponding to a second direction different from the first direction,
 wherein a first press of the first shift button immediately causes a selection of a first key in the first line of keys and a subsequent press of the first shift button before another button on the remote control unit is pressed causes a selection of a next key in the first line of keys in the first direction, and a press of a second shift button immediately causes a selection of a first key in the second line of keys and a subsequent press of the second shift button before another button on the remote control unit is pressed causes a selection of a next key in the second line of keys in the second direction.

9. The system of claim 8, wherein a number of lines of keys of the OSD keypad is the same as number of shift buttons on the remote control unit.

10. The system of claim 8, wherein a continued pressing of the first shift button before another button on the remote control unit is pressed causes a further shift of key selection in the first line of keys in the first direction.

11. The system of claim 10, wherein the further shift of key selection is one directional.

12. The system of claim 8, wherein the OSD keypad includes both character keys and command keys, and once the enter button is pressed, all the character keys are deselected.

13. The system of claim 8, wherein the first shift button incorporates a first directional symbol that coincides with the first direction of the first line of keys, and the second shift button incorporates a second directional symbol that coincides with the second direction of the second line of keys.

* * * * *